3,398,188
[4 - (2 - HALOALKANOYL)PHENOXY]- AND [4 - (2-HALOALKANOYL)PHENYLMERCAPTO] - ALKANOIC ACIDS
Everett M. Schultz, Ambler, Pa., assignor to Merck & Co., Inc., Rahway, N.J., a corporation of New Jersey
No Drawing. Continuation-in-part of application Ser. No. 155,961, Dec. 6, 1961. This application Mar. 4, 1964, Ser. No. 349,466
13 Claims. (Cl. 260—521)

ABSTRACT OF THE DISCLOSURE (4-alkanoylphenoxy)alkanoic acids and (4-alkanoylphenylmercapto)alkanoic acids which are substituted in the 2-position of the alkanoyl chain by an halogen atom; and the salts, esters and amide derivatives of the said acids. The products are diuretic and saluretic agents which are useful in the treatment of conditions associated with edema.

---

The products are obtained by treating a (4-alkanoylphenoxy)alkanoic acid or a (4-alkanoylphenylmercapto) alkanoic acid with an halogenating agent capable of adding halogen to the 2-position of the alkanoyl chain.

This application is a continuation-in-part of application Serial No. 155,961, filed December 6, 1961, now U.S. Patent No. 3,255,241, issued June 7, 1966; which is a continuation-in-part of application Serial No. 83,635, filed January 19, 1961, and now abandoned.

This invention relates to a new class of [4-(2-haloalkanoyl)phenoxy]- and [4-(2-haloalkanoyl)phenylmercapto]-alkanoic acids, compounds having highly active diuretic properties and which are useful in therapy for the treatment of conditions resulting from an excessively high retention of electrolyte or fluid within the body, such as in the treatment of edematous conditions resulting, for example, from congestive heart failure.

Pharmacological studies of the products of this invention demonstrate that they possess diuretic, natriuretic and chloruretic properties and are therefore useful in the treatment of many ailments resulting from an excessive retention of electrolytes, especially sodium, chloride or sodium and chloride ions, as in the treatment of hypertension, edema and other conditions associated with electrolyte and fluid retention.

The [4-(2-haloalkanoyl)phenoxy]- and [4-(2-haloalkanoyl)phenylmercapto]-alkanoic acids of the invention are compounds having the following structural formula:

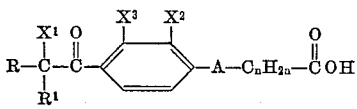

wherein A is a member selected from the group consisting of oxygen and sulfur, R is a member selected from the group consisting of hydrogen, lower alkyl, trifluoromethyl substituted lower alkyl, e.g., 2,2,2-trifluoroethyl, 1-(trifluoromethyl)ethyl, etc. and cycloalkyl, e.g., cycloalkyl containing 4–6 nuclear carbon atoms, such as cyclopentyl, cyclohexyl, etc., $R^1$ is a member selected from the group consisting of hydrogen and lower alkyl and, taken together, R and $R^1$ may be joined to form a cycloalkyl ring containing five nuclear carbon atoms, $X^1$ represents halogen, e.g., bromine, chlorine, iodine, etc., $X^2$ and $X^3$ represent similar or dissimilar radicals selected from the group consisting of hydrogen, halogen, lower alkyl, lower alkoxy and, taken together, the $X^2$ and $X^3$ radicals may be combined to form a 1,3-butadienylene linkage (i.e., —CH=CH—CH=CH—) at least one of which $X^2$ and $X^3$ radicals is other than hydrogen and $n$ is an integer having a value of 1–5.

Also included in this invention are the acid addition salts of the instant phenoxyalkanoic and phenylmercaptoalkanoic acids, which are prepared by the reaction of the said acids with a base having a non-toxic pharmacologically acceptable cation. In general, any base which will form an acid addition salt with the instant carboxylic acids and whose pharmacological properties will not cause an adverse physiological effect when ingested by the body system is considered as being within the scope of this invention; suitable bases thus include, for example, the alkali metal and alkaline earth metal hydroxides, carbonates, etc., ammonia, primary, secondary and tertiary amines, such as monoalkylamines, dialkylamines, trialkylamines, and nitrogen containing heterocyclic amines, e.g., piperidine, etc. The acid addition salts thus produced are the functional equivalent of the corresponding phenoxyacetic acids and one skilled in the art will appreciate that to the extent that the phenoxyacetic acids of the invention are useful in therapy, the variety of acid addition salts embraced by this invention are limited only by the criterion that the bases employed in forming the salts be both nontoxic and physiologically acceptable.

This invention also relates to the ester and amide derivatives of the instant carboxylic acids, which are prepared by conventional methods well-known to those skilled in the art; thus, for example, the said ester derivatives may be prepared by the reaction of the carboxylic acid product of the invention with an alcohol as, for example, with a lower alkyl alcohol to prepare the corresponding esterified derivative or, alternatively, converting the carboxylic acid product to its acid halide by conventional methods and treating the acid halide thus formed with the appropriate lower alkanol. Similarly, the amide derivatives of the instant carboxylic acids may be prepared by treating the acid halide of the instant acids with ammonia or an appropriate amine to produce the corresponding amide. Another process for preparing the said amide derivatives comprises the conversion of the acid products of the invention to their corresponding ester derivatives and treating the said ester with ammonia or an appropriate amine to produce the corresponding amide. The ester derivatives of the carboxylic acids of the invention may also be prepared inherently during the process by employing the ester analogs of the corresponding omega-halo alkanoic acid reactants described in the preparative method discussed infra, wherein an omega-halo alkanoic acid is allowed to react with an appropriate 4-alkanoylphenol to produce the corresponding (4-alkanoylphenoxy)alkanoic acid (which is then halogenated to the desired [4-(2-haloalkanoyl)phenoxy]alkanoic acid product). These and other equivalent methods for the preparation of the ester and amide derivatives of the instant carboxylic acids will be apparent to one having ordinary skill in the art and to the extent that the said derivatives are both non-toxic and physiologically acceptable to the body system the said esters and amides are the functional equivalent of the corresponding carboxylic acid products.

The [4-(2-haloalkanoyl)phenoxy]- and [4-(2-haloalkanoyl)phenylmercapto]-alkanoic acids of the invention are prepared by the reaction of an appropriate (4-alkanoylphenoxy)- or (4-alkanoylphenylmercapto)-alkanoic acid with a suitable halogenating agent. We have found it most advantageous to employ bromine as the halogenating agent to produce the corresponding [4-(2-bromoalkanoyl)phenoxy]- or [4-(2-bromoalkanoyl)phenylmercapto]-alkanoic acid and, if desired, the said 2-bromo derivative may be converted to its corresponding chloroanalog by treating the 2-bromo derivative with lithium chloride, with heating. The reaction solvent and the temperature at which the reaction is conducted are not particularly critical aspects of the invention inasmuch as any solvent in which the reactants are reasonably soluble and which is inert or undergoes only minimal side reactions with the (4-alkanoylphenoxy)- and (4-alkanoylphenylmercapto)-alkanoic acid reactants and the halogenating agents of the process may be employed with good results and the reaction may be conducted at room temperature or conducted with heating to obtain the desired rate of reaction. We have found it most advantageous to conduct the reaction in an acetic acid medium.

The [4-(2-haloalkanoyl)phenoxy]- and [4-(2-haloalkanoyl)phenylmercapto]-alkanoic acids of the invention are generally obtained as crystalline solids and, if desired, may be purified by recrystallization from a solvent. Suitable solvents include, for example, benzene, cyclohexane, isopropyl alcohol and mixtures of hexane and benzene.

The (4-alkanoylphenoxy)- and (4-alkanoylphenylmercapto)-alkanoic acids employed as reactants in the halogenation process are conveniently prepared by any one of a number of various processes. One method of preparation comprises the reaction of a suitable alkanoyl halide with the appropriate phenoxyalkanoic acid or phenylmercaptoalkanoic acid in the presence of a metallic halide to produce the desired 4-alkanoyl substituted derivative of the latter acids. The following equation illustrates the reaction:

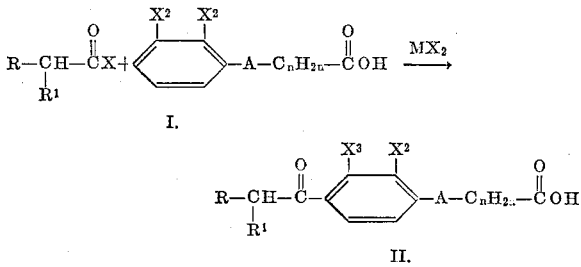

wherein the radicals A, R, $R^1$, $X^2$, $X^3$ and $n$ are as defined above, X represents halogen, e.g., bromine, chlorine, etc. and $MX_2$ represents a metallic halide. The said metallic halides serve as catalysts in promoting the condensation of the alkanoyl halide reactant with the phenoxy- or phenylmercapto-alkanoic acid compound; catalysts which we have found to be particularly suitable for this purpose include anhydrous aluminum chloride and boron trifluoride. The acid halide reactants of the foregoing process, identified as compound I in the above equation, are easily prepared by conventional methods. For example, the corresponding acids of the said alkanoyl halide reactants react with phosphorus trichloride or thionyl chloride to produce the desired alkanoyl chloride. A modification of the said acid halide synthesis consists in first forming the corresponding sodium salt of the alkanoic acid and allowing the sodium alkanoate thus formed to react with phosphorus oxychloride, phosphorous pentachloride or thionyl chloride to produce the desired alkanoyl chloride.

Another method for preparing the (4-alkanoylphenoxy) alkanoic acid reactants of the invention consists in the reaction of a suitable alkanoyl halide with an appropriate anisole or phenetole, or appropriate nuclear substituted derivative thereof, in the presence of anhydrous aluminum chloride in a solvent as, for example, a ligroin or carbon disulfide solvent. The acylated phenetole or anisole thus produced is then converted to the corresponding phenol by treating the said 4-alkanoylphenetole or 4-alkanoylanisole with aluminum chloride in a suitable solvent, such as ligroin or heptane, with slight heating. The 4-alkanoylphenol is then allowed to react with an omega-haloalkanoic acid in the presence of a base. Preferably, the base and substituted haloalkanoic acid reactant are added gradually to the solution of the phenol so that the reaction mixture is neither acidic or basic in nature but substantially neutral. Upon completion of the reaction the mixture thus obtained is acidified with hydrochloric acid to generate the desired (4-alkanoylphenoxy)alkanoic acid (II). When an esterified derivative of the omega-haloalkanoic acid reactant is employed, in lieu of the corresponding acid, the said ester and 4-alkanoylphenol reactants are allowed to react in the presence of a strong base such as sodium ethoxide and ethanol or sodium hydride in glyme, i.e., glycol dimethyl ether. The (4-alkanoylphenoxy)alkanoic acid ester thus formed is then hydrolyzed by conventional means as, for example, by treating the said ester with a sodium hydroxide solution; and the mixture thus formed is acidified with hydrochloric acid to precipitate the desired (4-alkanoylphenoxy)alkanoic acid product (II). The following equation illustrates the above-described process:

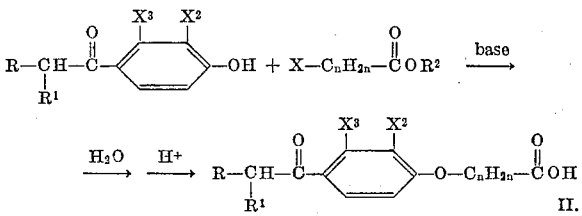

wherein R, $R^1$, $X^2$, $X^3$ and $n$ are as defined above, X represents halogen and $R^2$ represents lower alkyl, e.g., methyl, ethyl, propyl, etc.

Another method for preparing the (4-alkanoylphenoxy)- and (4-alkanoylphenylmercapto)-alkanoic acid reactants of the instant process, and one particularly suited for preparing those reactants wherein the $R^1$ radical on the 2-carbon of the alkanoyl chain is a methyl group, comprises the reaction of an appropriate (4-alkanoylphenoxy)- or (4-alkanoylphenylmercapto)-carboxylic acid with formaldehyde or paraformaldehyde and the acid addition salt of a secondary amine, e.g., dimethylamine hydrochloride, to produce the corresponding [4-(2-sec.-aminomethylalkanoyl)phenoxy]- or [4 - (2 - sec. - aminomethylalkanoyl)phenylmercapto]-alkanoic acid. The derivative thus formed is then treated with a weak base, such as sodium bicarbonate, to obtain the corresponding [4-(2-methylenealkanoyl)phenoxy] - or [4 - (2 - methylenealkanoyl)phenylmercapto]-alkanoic acid. The methylene derivative is then hydrogenated in the presence of palladium on charcoal in isopropyl alcohol to produce the desired [4-(2-methylalkanoyl)phenoxy]- or [4-(2-methylalkanoyl)phenylmercapto]-alkanoic acid compound.

A preferred embodiment of the invention is the class of [4-(2-haloalkanoyl)phenoxy]acetic acids having the following structural formula:

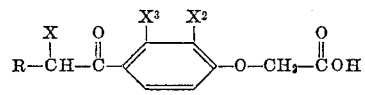

wherein R is a member selected from the group consisting of lower alkyl and cycloalkyl containing 5–6 nuclear carbon atoms, X is halogen, e.g., chlorine, bromine, iodine, etc, and $X^2$ and $X^3$ each represents a member selected from the group consisting of hydrogen, halogen and lower alkyl. The above-described class of compounds exhibit particularly good diuretic, natriuretic and chloruretic properties and are thus especially useful agents in the treatment of conditions associated with electrolyte and fluid retention.

The following examples are illustrative of the products of the invention; however, the examples are illustrative only and the invention is not to be construed as being limited thereto.

Example 1.—[3-chloro-4-(2-bromoisovaleryl)phenoxy] acetic acid

Step A: (4-isovaleryl-3-chlorophenoxy)acetic acid.— Powdered aluminum chloride (101 g., 0.755 mole) and carbon disulfide (250 ml.) are placed in a 1-liter, 4- necked flask equipped with a stirrer, dropping funnel, reflux condenser and internal thermometer. (3-chlorophenoxy)acetic acid (44.7 g., 0.24 mole) is added in portions with stirring and isovaleryl chloride (32.6 g., 0.272 mole) is added dropwise with stirring over a period of 0.5 hour at a temperature of about 22–26° C. After stirring 1 hour at room temperature, the reaction flask is placed in a water bath and the temperature maintained at 50° C. for 3 hours. The carbon disulfide then is decanted and the residue is added to a mixture of 1 kg. of ice and 100 ml. of hydrochloric acid. The gummy solid obtained is triturated with 1-liter of hot 50% sodium bicarbonate and the resulting solution is filtered from insoluble aluminum salts. The filtrate is treated with Darco (decolorizing charcoal) (5 g.,) and acidified with hydrochloric acid. The solid that separates is dried and crystallized from benzene to give 33.8 g. of (4-isovaleryl-3-chlorophenoxy)acetic acid, M.P. 107–108° C.

Step B: [3 - chloro - 4-(2-bromoisovaleryl)phenoxy] acetic acid.—[3 - chloro-4-isovalerylphenoxy]acetic acid (14.6 g., 0.0054 mole) in acetic acid (100 ml.) is treated with bromine (8.7 g., 0.054 mole) in 20 ml. of acetic acid by adding the bromine solution to the solution of the keto acid dropwise with stirring over a 10–15 minute period. The reaction is initiated by adding 2 drops of 48% hydrobromic acid. The mixture is added to about 1 liter of water containing a little sodium bisulfite and the solid that separates is collected, washed with water and dried. The product obtained is crystallized from isopropyl alcohol to give 17.0 g. of [3-chloro-4-(2-bromoisovaleryl) phenoxy]acetic acid, M.P. 171–172° C.

Example 2.—[3-chloro-4-(2-chloroisovaleryl)phenoxy] acetic acid

A mixture of [3-chloro-4-(2-bromoisovaleryl)phenoxy] acetic acid, obtained as described in Example 1 (5.8 g., 0.0165 mole) and lithium chloride (2.12 g., 0.05 mole) are dissolved in dimethylformamide (60 ml.) and heated on a steam bath for 3 hours. The colorless solution obtained is added to 500 ml. of water and the solid that separates is crystallized from benzene to give 4.0 g. of [3-chloro - 4-(2-chloroisovaleryl)phenoxy]acetic acid, M.P. 146–147° C.

Example 3.—[3-chloro-4-(2-bromo-2-cyclohexaneacetyl) phenoxy]acetic acid

Step A: [3 - chloro - 4-(cyclohexaneacetyl)phenoxy] acetic acid.—A dry 1-liter, round flask is equipped with a stirrer and reflux condenser. Into the flask is placed cyclohexaneacetyl chloride (32.3 g., 0.205 mole), (3-chlorophenoxy)acetic acid (36.3 g., 0.205 mole) and carbon disulfide (240 ml.). Aluminum chloride (43.5 g., 0.325 mole) is added in small portions at about 10° C. with mechanial stirring. Following the addition of half of the aluminum chloride the mixture becomes quite viscous and the remainder of the aluminum chloride is added with hand stirring. When the mixture becomes mobile enough, mechanical stirring is resumed and continued for 1 hour. The mixture then is heated at about 50° C. with stirring for an additional 3 hours, the carbon disulfide then is decanted and the residue is added to a mixture of 1 kg. of ice and 30 ml. of concentrated hydrochloric acid. The oil that separates is extracted with ether and the ether extract then extracted with 10% sodium bicarbonate solution; the bicarbonate extract is then acidified with concentrated hydrochloric acid to give 22.3 g. of [3-chloro-4-(cyclohexaneacetyl)phenoxy]acetic acid which, after crystallization from benzene, melts at 118–118.5° C.

Step B: [3 - chloro-4-(2-bromo-2-cyclohexaneacetyl) phenoxy]acetic acid.—The [3-chloro-4-(cyclohexaneacetyl)phenoxy]acetic acid is brominated by substantially the same procedure described in Example 1, Step B, to give [3 - chloro - 4-(2-bromo-2-cyclohexaneacetyl)phenoxy]acetic acid, M.P. 170–171.5° C.

Example 4.—[3-chloro-4-(2-bromo-2-cyclopentaneacetyl)phenoxy]acetic acid

Step A: [3 - chloro - 4-cyclopentaneacetyl)phenoxy] acetic acid.—The reaction of cyclopentaneacetyl chloride (58 g., 0.40 mole) with (3-chlorophenoxy)acetic acid (72.5 g., 0.4 mole) in the presence of aluminum chloride (174 g., 1.3 mole) is carried out in substantially the same manner as described in Example 3, Step A. The product obtained is recrystallized from benzene to give 51.0 g. of [3 - chloro-4-(cyclopentaneacetyl)phenoxy] acetic acid, M.P. 107.5–108.5° C.

Step B: [3 - chloro-4-(2-bromo-2-cyclopentaneacetyl) phenoxy]acetic acid.—The [3 - chloro-4-(cyclopentaneacetyl)phenoxy]acetic acid is brominated by substantially the same method described in Example 1, Step B, to give [3 - chloro - 4 - (2-bromo-2-cyclopentaneacetyl)phenoxy]acetic acid, M.P. 175.5–177° C.

Example 5.—[2,3-dichloro-4-(2-bromo-2-cyclopentaneacetyl)phenoxy]acetic acid

Step A: 2′,3′-dichloro-4′-hydroxy-1-cyclopentaneacetophenone.—To a mixture of 2,3-dichloroanisole (38.8 g., 0.213 mole) and cyclopentaneacetyl chloride (25 g., 0.17 mole) in carbon disulfide (250 ml.), there is added with stirring, aluminum chloride (46.6 g., 0.35 mole). The mixture then is heated at 50–60° C. for 5 hours. The carbon disulfide then is removed by distillation, heptane (200 ml.) and aluminum chloride (26.67 g., 0.2 mole) is added and the mixture stirred and heated on the steam bath for 2 hours. The solvent then is decanted and ice water (400 ml.) is added slowly with external cooling in an ice bath. This is followed by addition of concentrated hydrochloric acid (40 ml.) and extraction with ether. The ether extract is washed with water and the ether then evaporated. The residue is added to 10% sodium hydroxide solution (160 ml.) and the mixture heated on a steam bath for 3 hours to saponify any ester that may have been formed. After acidification with hydrochloric acid, 2′,3′-dichloro - 4′-hydroxy-1-cyclopentaneacetophenone is obtained, M.P. 86–88° C., 28 g. yield. After recrystallization from a mixture of isopropyl alcohol and water and an additional recrystallization from cyclohexane the product melts at 87–88° C.

Step B: [2,3-dichloro-4-(cyclopentaneacetyl)phenoxy] acetic acid.—To a suspension of sodium hydride (51% in mineral oil) (2.42 g., 0.05 mole) in dry glycol dimethyl ether the compound 2′,3′-dichloro-4′-hydroxy-1-cyclopentaneacetophenone (0.050 mole) is added slowly in enough glycol dimethyl ether to dissolve it. The mixture is stirred for 15 minutes and ethyl bromoacetate (8.45 g., 0.050 mole) is added dropwise with stirring. The mixture then is refluxed for 2.5 hours and the glycol dimethyl ether evaporated under reduced pressure at 80–90° C. Sodium hydroxide (4.14 g., 0.101 mole) in 30 ml. of water is added to the residue, the mixture is stirred and heated at 90° C. for 1.5 hours and the residual mineral oil extracted with ether from the cooled solution. The aqueous layer thus obtained is acidified with hydrochloric acid and the solid that separates is dissolved in sodium bicarbonate solution and treated with Norite, filtered and acidified to give a 76% yield of [2,3-dichloro-4-(cyclopentaneacetyl)phenoxy]acetic acid which, after crystallization from a mixture of ether and hexane and then from a mixture of benzene and hexane, melts at 127–128° C.

Step C: [2,3-dichloro-4 - (2 - bromo - 2 - cyclopentaneacetyl)phenoxy]acetic acid.—The [2,3-dichloro-4-cyclopentaneacetylphenoxy]acetic acid obtained as described above is brominated by substantially the same procedure described in Example 1, Step B, to yield [2,3-dichloro-4- (2 - bromo - 2 - cyclopentaneacetyl)phenoxy]acetic acid, M.P. 159–160° C.

Example 6.—[2,3-dimethyl-4-(2-bromo-2-cyclopentaneacetyl)phenoxy]acetic acid

Step A: [2,3 - dimethyl - 4 - (2 - cyclopentaneacetyl)phenoxy]acetic acid.—By replacing the 3-chlorophenoxyacetic acid and the isovaleryl chloride employed in Example 1, Step A, by equimolecular quantities of (2,3-dimethylphenoxy)acetic acid and cyclopentaneacetyl chloride and following substantially the same procedure described in Example 1, Step A, there is obtained a 10.5% yield of [2,3-dimethyl-4-(2-cyclopentaneacetyl)phenoxy]acetic acid which, after crystallization from cyclohexane, melts at 93–94.5° C.

Step B: [2,3-dimethyl - 4 - (2-bromo - 2 - cyclopentaneacetyl)phenoxy]acetic acid.—The product obtained as described in Step A is brominated by substantially the same procedure described in Example 1, Step B, to give [2,3-dimethyl-4-(2 - bromo - 2 - cyclopentaneacetyl)phenoxy]acetic acid, M.P. 157–158° C.

Example 7.—[2,3-dichloro-4-(2-bromo-2-cyclohexaneacetyl)phenoxy]acetic acid

Step A: 2-cyclohexyl - 2',3' - dichloro-4'-hydroxyacetophenone.—To a mixture of 2,3-dichloroanisole (70.0 g., 0.395 mole) and cyclohexaneacetyl chloride (72.2 g., 0.45 mole) in carbon disulfide (250 ml.) there is added, with stirring, aluminum chloride (26.67 g., 0.2 mole). The mixture is heated at 50–60° C. for 5 hours. The carbon disulfide then is removed by distillation, heptane (200 ml.) and aluminum chloride (26.67 g., 0.2 mole) is added and the mixture stirred and heated on the steam bath for 2 hours. The solution then is decanted and ice water (400 ml.) is added slowly with external cooling in an ice bath. This is followed by addition of concentrated hydrochloric acid (40 ml.) and extraction with ether. The ether extract is washed with water and the ether then evaporated. The residue is added to 10% sodium hydroxide solution (160 ml.) and the mixture heated on a steam bath for 3 hours to saponify any ester that may have been formed. After acidification with hydrochloric acid, 2-cyclohexyl-2',3'-dichloro-4'-hydroxyacetophenone is obtained, M.P. 130–132° C., yield 60 g.

Step B: [2,3-dichloro-4-(cyclohexaneacetyl)phenoxy]acetic acid.—By replacing the acetophenone of Example 5, Step B by an equimolecular quantity of 2-cyclohexyl-2',3'-dichloro-4'-hydroxyacetophenone and following substantially the same procedure described therein there is obtained [2,3-dichloro - 4 - (cyclohexaneacetyl)phenoxy]acetic acid, M.P. 147–148° C.

Step C: [2,3-dichloro-4-(2-bromo-2-cyclohexaneacetyl)phenoxy]acetic acid.—The [2,3-dichloro-4-(cyclohexaneacetyl)phenoxy]acetic acid is brominated by substantially the same procedure described in Example 1, Step B, to give [2,3-dichloro-4 - (2 - bromo - 2 - cyclohexaneacetyl)phenoxy]acetic acid, M.P. 170–171° C.

Example 8.—[3-chloro-4-(2-bromo-3,3-dimethylbutyryl)phenoxy]acetic acid

Step A: 2' - chloro - 3,3 - dimethyl - 4' - hydroxybutyrophenone.—The reaction of 3,3-dimethylbutyryl chloride (19.9 g., 0.148 mole), 3-chlorophenetole (23 g., 0.148 mole) and aluminum chloride (61 g., 0.444 mole) in petroleum ether is carried out in substantially the same manner described in Example 5, Step A, to give 9.1 g. of 2'-chloro-3,3-dimethyl-4'-hydroxybutyrophenone, B.P. 128–165° C. at 0.8 mm. pressure, M.P. 97–98° C. after crytallization from cyclohexane.

Step B: [3-chloro - 4 - (3,3 - dimethylbutyryl)phenoxy] acetic acid.—By following substantially the same procedure described in Example 5, Step B, but replacing the phenone used therein by an equimolecular quantity of 2'-chloro-3,3-dimethyl-4'-hydroxybutyrophenone, there is obtained 7.52 g. of [3-chloro-4-(3,3-dimethylbutyryl)phenoxy]acetic acid which melts at 103–104° C., after crystallization from benzene.

Step C: [3-chloro-4-(2 - bromo - 3,3 - dimethylbutyryl)phenoxy]acetic acid.—The [3-chloro-4-(3,3-dimethylbutyryl) phenoxy]acetic acid obtained in Step B is brominated following substantially the same procedure described in Example 1, Step B, to yield [3-chloro-4-(2-bromo-3,3-dimethylbutyryl) phenoxy]acetic acid, M.P. 143–144° C.

Example 9.—[3-chloro-4-(2-iodoisovaleryl)phenoxy]acetic acid

The [3-chloro-4 - (2 - bromoisovaleryl)phenoxy]acetic acid, obtained as described in Example 1, is dissolved in acetone and excess sodium iodide is added. The mixture is stirred and refluxed for several hours and then cooled. Upon addition of water the [3-chloro-4-(2-iodoisovaleryl)phenoxy]acetic acid is precipitated and removed by filtration.

Example 10.—[2,3-dichloro-4-(2-bromoisovaleryl)phenoxy]acetic acid

Step A: 2',3'-dichloro-4'-hydroxyisovalerophenone.—A mixture of 2,3-dichloroanisole (53.11 g., 0.3 mole), carbon disulfide (350 ml.) and isovaleryl chloride (72.35 g., 0.6 mole) is treated, under anhydrous conditions, with aluminum chloride powder (40 g., 0.3 mole) over a period of 5 minutes with stirring. The mixture is stirred for 6 hours at room temperature and then allowed to stand at room temperature over night. The reaction mixture is heated with stirring in a 55° C. water bath until the evolution of hydrogen chloride ceases, then cooled to room temperature and treated, under anhydrous conditions, with aluminum chloride powder (40 g., 0.3 mole), over a period of 5 minutes with stirring. The mixture then is heated in a 55° C. water bath with stirring for 1½ hours. The carbon disulfide is removed by distillation and an equal volume of dry heptane is added and the mixture heated on a steam bath with stirring for about 3 hours. After cooling to room temperature, the heptane is decanted and the gummy residue is added to a mixture of ice (450 g.) and concentrated hydrochloric acid (45 ml.). The resulting oil is extracted with ether, dried over anhydrous sodium sulfate and the ether then removed under reduced pressure to give a semi-solid residue. This material is treated with excess 5% aqueous sodium hydroxide solution and heated under reflux for 1 hour, cooled and extracted with ether to remove insoluble oil. The clear aqueous solution is acidified with concentrated hydrochloric acid and the resulting oil is extracted with ether, the ethereal solution dried over anhydrous sodium sulfate and the ether removed under reduced pressure to give a solid. After one recrystallization from cyclohexane and one from carbon tetrachloride, there is obtained 57.2 g. (77%) of 2',3'-dichloro - 4'-hydroxyisovalerophenone in the form of prisms, M.P. 109.5–111.5° C. An additional recrystallization from cyclohexane gives 2',3'-dichloro-4'-hydroxyisovalerophenone, melting at 110–112° C.

Step B: (2,3 - dichloro - 4 - isovalerylphenoxy)acetic acid.—2',3'-dichloro - 4'-hydroxyisovalerophenone (55.60 g., 0.225 mole) in water (278 ml.) is combined with a solution of sodium hydroxide (9.0 g., 0.225 mole) in water (18 ml.). To the resulting solution at 55° C. is added with stirring a solution of sodium chloroacetate [prepared by combining a solution of chloroacetic acid (21.26 g., 0.225 mole) in water (21 ml.) with a solution of sodium hydroxide (9.0 g., 0.225 mole) in water (18 ml.)] over a period of 30 minutes at a temperature of 53–55° C. The temperature is raised to 100° C. over a period of 30 minutes and stirring continued at 100° C. for 30 minutes. The reaction mixture at 100° C. is treated with a solution of sodium chloroacetate [prepared by combining a solution of chloroacetic acid (42.53 g., 0.450 mole) in water (43 ml.) with a solution of sodium hydroxide (18.0 g., 0.450 mole) in water (36 ml.)] over a period of 2½ hours. Simultaneously, and during the following 2½ hours of stirring at 100° C., a solution of sodium hydroxide (18.0 g., 0.450 mole) in water (36 ml.) is added at intervals when needed to keep the reaction mixture basic. The boiling solution is acidified with concentrated hydrochloric acid. The oil that separates after chilling in an ice bath to room temperature is extracted with ether, dried over anhydrous sodium sulfate and the ether evaporated at reduced pressure to give an oil. The oil is dissolved in benzene and the benzene removed under reduced pressure to give a waxy solid. Two recrystallizations of the solid material from a mixture of benzene and cyclohexane give 43.8 g., (64%) of (2,3-dichloro-4-isovalerylphenoxy)acetic acid in the form of a white solid, M.P. 110.5–112° C. Two additional recrystallizations from the same mixture do not change the melting point.

Step C: [2,3-dichloro - 4-(2-bromoisovaleryl)phenoxy] acetic acid.— The (2,3-dichloro-4-isovalerylphenoxy)acetic acid of Step B is brominated by substantially the same procedure described in Example 1, Step B, to give [2,3-dichloro - 4-(2-bromoisovaleryl)phenoxy]acetic acid, M.P. 147.5–148.5° C.

Example 11.—[3-chloro-4-(2-bromo-2-methylbutyryl) phenoxyl]acetic acid

Step A: (3-chloro - 4 - butyrylphenoxy)acetic acid.— Powdered aluminum chloride (217 g., 1.625 mole) and carbon disulfide (400 ml.) are placed in a 1-liter, 4-necked flask equipped with stirrer, dropping funnel, reflux condenser and internal thermometer. (3-chlorophenoxy)acetic acid (93.3 g., 0.5 mole) is added in portions with stirring and then n-butyryl chloride (66.6 g., 0.625 mole) is added in portions with stirring over a period of 0.5 hours at a temperature of about 22–26° C. After stirring one hour at room temperature, the reaction flask is placed in a water bath and the temperature maintained at 50° C. for three hours. The carbon disulfide then is decanted and the aluminum complex remaining is added to a mixture of ice (1 kg.) and concentrated hydrochloric acid (100 ml.). A solid separates and is dissolved in saturated sodium bicarbonate solution (1.5 l.). The solution is filtered and the clear yellow filtrate is acidified with hydrochloric acid. The yellow oil that separates solidifies slowly to give a solid melting at 76–85° C. After recrystallization from benzene, there is obtained 66.7 g. (51%) of (3-chloro-4-butyrylphenoxy)acetic acid, M.P. 89–90° C.

Step B: [3-chloro - 4-(2-dimethylaminomethylbutyryl) phenoxy]acetic acid hydrochloride.—In a 100 ml. round flask equipped with an outlet tube suitable for application of intermittent suction, an intimate mixture of (3-chloro-4-butyrylphenoxy)acetic acid (5.12 g., 0.02 mole), paraformaldehyde (0.7 g., 0.022 mole), dimethylamine hydrochloride (1.78 g., 0.02 mole) and acetic acid (4 drops) is heated on the steam bath for about 1.5 hours during which period suction is applied for about 1-minute intervals five or six times. Upon cooling a solid forms which is crystallized from acetonitrile and from isopropyl alcohol to give [3-chloro - 4-(2-dimethylaminomethylbutyryl)phenoxy]acetic acid hydrochloride, M.P. 127–129° C.

Step C: [3-chloro - 4 - (2-methylenebutyryl)phenoxy] acetic acid.—The Mannich compound obtained as described in Step B is dissolved in 25 ml. of water and the solution made slightly basic by the addition of 10% sodium bicarbonate solution. The resulting solution is heated for 25 minutes on a steam bath, cooled and acidified with 6N hydrochloric acid to give 3.7 g. (69%) of crude product, M.P. 108–109.5° C. After recrystallization from a mixture of cyclohexane and benzene there is obtained [3-chloro-4-(2-methylenebutyryl)phenoxy]acetic acid in the form of a colorless crystal, M.P. 109–111° C.

Step D: [3-chloro-4-(2-methylbutyryl)phenoxy]acetic acid.—[3 - chloro - 4-(2-methylenebutyryl)phenoxy]acetic acid (57.1 g., 0.212 mole) is dissolved in isopropyl alcohol (200 ml.) and 5% palladium on carbon (3.0 g.) is added. The mixture is hydrogenated at an initial pressure of 35 p.s.i. on a Parr apparatus. In 40 minutes the required amount of hydrogen is absorbed. The solution is warmed and filtered to remove the catalyst, the alcohol evaporated and the residue crystallized from benzene. There is obtained 41.2 g. of [3-chloro-4-(2-methylbutyryl)phenoxy] acetic acid, M.P. 138–139.5° C. A sample purified further by crystallization from benzene melts at 139–140° C.

Step E: [3-chloro-4-(2-bromo-2-methylbutyryl)phenoxy] acetic acid.—[3-chloro-4-(2-methylbutyryl)phenoxy]acetic acid (10 g., 0.037 mole) is dissolved in acetic acid (200 ml.) and bromine (6.0 g., 0.037 mole) in acetic acid (50 ml.) is added dropwise with stirring over 10–15 minutes. (The reaction is initiated in the beginning by adding 2 drops of 48% hydrobromic acid.) The mixture is added to 1 liter of water containing a little sodium bisulfite. The solid that separates is collected, washed with water, dried in air at 65° C., and crystallized from benzene. The product [3-chloro-4-(2-bromo-2-methylbutyryl)phenoxy]acetic acid (10.9 g.), melts at 123–124° C.

Example 12.—[3-chloro-4-(2-bromoisobutyryl)phenoxy] acetic acid

Step A: (3-chloro-4-isobutyrylphenoxy)acetic acid.— A 1 liter four-necked flask is equipped with an efficient stirrer, dropping funnel, reflux condenser and internal thermometer. The flask is flame-dried while flushing with nitrogen gas. Powdered aluminum chloride (83.9 g., 0.63 mole) is placed in the flask along with carbon disulfide (200 ml.). 3-chlorophenoxyacetic acid (37.3 g., 0.20 mole) is added in portions with stirring. Then isobutyryl chloride (26.6 g., 0.25 mole) is added dropwise with stirring over a period of 0.5 hour. The temperature rises slowly from 22° C. to 26° C. After stirring one hour at room temperature, the reaction flask is immersed in a water bath and the temperature (bath) is maintained at 50° C. for three hours. After one hour, the separation of a viscous precipitate makes stirring impossible.

After the heating period has ended, the carbon disulfide is decanted and the viscous aluminum complex is scraped from the flask and added in portions to a mixture of 500 g. of ice and 125 ml. of concentrated hydrochloric acid. A yellow solid separates. When the ice has melted, the mixture is extracted with benzene (250 ml.). At this point an insoluble solid forms at the benzene-water interface. The water layer is separated and the benzene solution containing the suspended insoluble solid is chilled in an ice bath and then filtered to obtain a moist crude product (23.9 g.). The solid is added slowly to 200 ml. of saturated sodium bicarbonate solution and triturated until almost all is dissolved. When effervescence ceases there remains a small amount of undissolved yellow, soft solid. This is removed by gravity filtration and the filtrate is cautiously acidified with concentrated hydrochloric acid. After chilling the mixture in an ice bath, the white precipitate is collected by filtration and dried in an oven at 65° C. The yield is 8.93 g. (17.3%) of (3-chloro-4-isobutyrylphenoxy)acetic acid, M.P. 137–139° C. (corr.).

Step B: [3-chloro-4-(2-bromoisobutyryl)phenoxy]acetic acid.—(3 - chloro - 4 - isobutyrylphenoxy)acetic acid (10.17 g., 0.0397 mole) is dissolved in 250 ml. of glacial acetic acid at room temperature in a 500 ml. roundbottom flask equipped with stirrer, dropping funnel and outlet tube. Bromine (6.34 g., 0.0397 mole) in 30 ml. of glacial acetic acid is added dropwise to the reaction mixture at 25° C. with stirring during a period of one hour. The bromine reacts readily and some hydrogen bromide is evolved. Stirring is continued an additional hour and then the mixture is added to a mixture of 300 g. of ice and 500 ml. of water. A white solid separates which is filtered by suction after the ice melts. The solid is washed on the filter with a little water and dried at 65° C. to constant weight. The crude product is crystallized from benzene (70 ml.) and the mixture cooled to room temperature over a 30 minute period, and at 5° C. for one hour. 8.39 g. (63%) of [3-chloro-4-(2-bromoisobutyryl) phenoxy]acetic acid is collected by suction filtration and dried at 65° C., M.P. 124.5–125° C.

Example 13.—[3-chloro-4-(2-ethyl-2-bromobutyryl) phenoxy]acetic acid

Step A: 2-ethyl-3'-chloro-4'-hydroxybutyrophenone.—To a mixture of 3-chlorophenetole (31.52 g., 0.2 mole) and 2-ethyl-butyrylchloride (26.92 g., 0.2 mole) in petroleum ether, aluminum chloride (73.34 g., 0.6 mole) is added gradually with stirring at 5° C. over a period of 0.5 hour. The mixture is stirred at 5° C. for 20 minutes and then allowed to warm to 25° C. while stirring for an additional three hours. The mixture then is kept at 25–30° C. for 48 hours. The petroleum ether then is decanted and the residue added to 500 g. of ice containing 40 ml. of concentrated hydrochloric acid. The dark oil that separates is extracted with ether and the ether solution washed with water and extracted with 2.5% sodium hydroxide. The sodium hydroxide extract is treated with Norite, filtered free of carbon and acidified with hydrochloric acid to give a green oil which in turn is extracted with ether. The ether extract is dried over sodium sulfate, the ether evaporated and the residue distilled at 148–181° C. at 0.3 mm. pressure to give 11.44 g. (25%) of 2-ethyl-3'-chloro-4'-hydroxybutyrophenone.

Step B: [3 - chloro - 4-(2-ethylbutyryl)phenoxy]acetic acid.—2-ethyl-3'-chloro-4'-hydroxybutyrophenone (11.44 g., 0.050 mole, in enough glycol dimethyl ether to dissolve it, is added slowly to a suspension of 2.42 g. (0.05 mole) sodium hydride (51% in mineral oil) in glycol dimethyl ether. The mixture is stirred for 15 minutes and ethyl bromoacetate (8.45 g., 0.050 mole) is added dropwise with stirring. The mixture then is refluxed for 2.5 hours and the glycol dimethyl ether evaporated under reduced pressure at 80–90° C. Sodium hydroxide (4.14 g., 0.101 mole) in 30 ml. of water is added to the residue, the mixture is stirred and heated at 90° C. for 1.5 hours and the residual mineral oil extracted with ether from the cooled solution. The aqueous layer is acidified with hydrochloric acid and the solid that separates is dissolved in sodium bicarbonate solution and treated with Norite, filtered and acidified to give 12.3 g., (85%) of [3-chloro-4-(2-ethylbutyryl)phenoxy]acetic acid which, after drying in air, melts at 146–147° C. Crystallization from benzene gives the product melting at 147–149° C.

Step C: [3-chloro-4-(2-ethyl-2-bromobutyryl)phenoxy] acetic acid.—To a solution of [3-chloro-4-(2-ethylbutyryl) phenoxy]acetic acid (10.64 g., 0.0374 mole) in 200 ml. of acetic acid is added with stirring 48% hydrobromic acid (2 drops) followed by the dropwise addition of bromine (6.0 g., 0.0374 mole) in 50 ml. of acetic acid. After the addition is completed, the mixture is stirred for 15 minutes and then poured into one liter of water containing 2 g. of sodium bisulfite. The solid that separates is collected on a filter, washed with water, dried in air and crystallized from 55 ml. of benzene to give 10.16 g. of [3-chloro-4-(2-ethyl-2 - bromobutyryl)phenoxy]acetic acid, M.P. 130–131° C.

Example 14.—[3-chloro-4-(1-bromocyclopentylcarbonyl) phenoxy]acetic acid

Step A: Cyclopentyl 2-chloro-4-methoxyphenyl ketone.—To a pre-cooled mixture of 3-chloroanisole (47.8 g., 0.334 mole), cyclopentanecarbonyl chloride (44.4 g., 0.334 mole) and petroleum ether (300 ml.), powdered aluminum chloride (48.0 g., 0.36 mole) is added over a period of one hour with stirring. This mixture is heated at 40° C. for 6½ hours with intermittent stirring, cooled, poured into a mixture of ice water (400 ml.) and concentrated hydrochloric acid (30 ml.) and extracted with ether. The ether extract is dried and distilled to give cyclopentyl 2-chloro-4-methoxyphenyl ketone, B.P. 120–150° C. (0.5 mm. pressure).

Step B: Cyclopentyl 2-chloro-4-hydroxyphenyl ketone.—To a solution of cyclopentyl 2-chloro-4-methoxyphenyl ketone (105 g., 0.438 mole) in purified n-heptane (300 ml.) powdered aluminum chloride (146 g., 1.10 mole) is added over a period of 15 minutes with stirring. The mixture is heated for 5 hours at 100° C., cooled and added to a mixture of ice-water (300 ml.) and concentrated hydrochloric acid (30 ml.), extracted with ether and fractionally distilled. The viscous product obtained, B.P. 162–190° C. (0.4 mm. pressure), is purified by crystallization from a mixture of ether and petroleum ether and recrystallized from benzene to give 8.78 g. (8.92%) of cyclopentyl 2-chloro-4-hydroxyphenyl ketone, M.P. 131–133.5° C.

Step C: [3-chloro - 4 - (cyclopentylcarbonyl)phenoxy] acetic acid.—Cyclopentyl 2-chloro-4-hydroxyphenyl ketone (8.28 g., 0.037 mole) is dissolved in dry 1,2-dimethoxyethane (150 ml.) and 50% sodium hydride in mineral oil (1.92 g., 0.040 mole) is added. To this suspension ethyl bromoacetate is added slowly (7.52 g., 0.045 mole), the mixture refluxed for 2½ hours with stirring, and the solvent then removed and water (50 ml.) and sodium hydroxide (3.6 g., 0.09 mole) added. The mixture is refluxed for 2 hours, cooled and acidified with concentrated hydrochloric acid. The crude product obtained is purified by repeated crystallizations from an acetone-ether solution to give 5.23 g. of [3 - chloro - 4 - (cyclopentylcarbonyl) phenoxy]acetic acid, M.P. 138–139° C.

Step D: [3-chloro - 4 - (1 - bromocyclopentylcarbonyl) phenoxy]acetic acid.—To [3-chloro - 4 - (cyclopentylcarbonyl)phenoxy]acetic acid (4.6 g., 0.016 mole) dissolved in acetic acid (100 ml.), bromine (2.6 g., 0.016 mole) in acetic acid (10 ml.) is added slowly with stirring over ½ hour. The reaction mixture is poured into one liter of water containing sodium bisulfite (1 g.). The oil that separates gradually solidifies. The solid is dried in air to obtain 3.9 g. of [3-chloro-4-(1-bromocyclopentylcarbonyl) phenoxy]acetic acid, M.P. 149–150° C.

Example 15.—[2,3-dichloro-4-(2-bromo-2-ethylbutyryl) phenoxy]acetic acid

Step A: 2-ethyl-2',3'-dichloro - 4' - hydroxybutyrophenone.—A mixture of 2,3-dichloro anisole (53.11 g., 0.3 mole), carbon disulfide (350 ml.) and 2-ethylbutyryl chloride (80.77 g., 0.6 mole) is treated, under anhydrous conditions, with aluminum chloride powder (40.00 g., 0.3 mole), over a period of 5 minutes with stirring. The mixture is stirred for 6 hours at room temperature and then allowed to stand at room temperature overnight. The reaction mixture is heated with stirring in a 55° C. water bath until the evolution of hydrogen chloride ceases (1½ hours), cooled to room temperature and treated, under anhydrous conditions, with aluminum chloride powder (40.00 g., 0.3 mole), over a period of 5 minutes with stirring. The carbon disulfide is then removed under reduced pressure by distillation. An equal volume of dry heptane is added and the mixture is heated on a steam bath, with stirring, for 3 hours. After cooling to room temperature, the heptane is decanted and the gummy residue is added to a mixture of ice (450 g.) and concentrated hydrochloric acid (45 ml.). The resulting oil is extracted with ether, dried over anhydrous sodium sulfate and the ether then removed under reduced pressure to give a semi-solid residue. This material is treated with excess 5% aqueous sodium hydroxide solution and heated under reflux for 1 hour, then cooled and extracted with ether to remove insoluble oil. The clear aqueous solution is acidified with concentrated hydrochloric acid, the resulting oil extracted with ether and the residual oil distilled to give 34.45 g. (44%) of product in the form of a liquid, B.P. 140–142° C. at 0.5 mm. pressure. After three recrystallizations from hexane, 2-ethyl-2',3'-dichloro-4'-hydroxybutyrophenone is obtained in the form of white needles, M.P. 85–86° C.

Step B: [2,3-dichloro-4-(2-ethylbutyryl)phenoxy]acetic acid.—A solution of sodium (2.53 g., 0.11 mole) in absolute ethanol (300 ml.) is treated first with 2-ethyl-2',3'-dichloro-4'-hydroxybutyrophenone (26.12 g., 0.1 mole) and then with ethyl bromoacetate (20.04 g., 0.12 mole) and the resulting clear solution is heated under reflux, with stirring, for 2 hours. Then aqueous 5% potassium hydroxide (11.22 g., 0.2 mole) is added and refluxing with stirring is continued for 1 additional hour. The alcohol is removed by distillation at atmospheric pressure and the boiling aqueous residue is made acid to Congo red test paper by the addition of concentrated hydrochloric acid. An oil separates which solidifies after cooling to room temperature. It is extracted with ether, the ethereal extract dried over anhydrous sodium sulfate, and the ether then is removed under reduced pressure to give 31.9 g. (100%) of [2,3-dichloro-4-(2-ethylbutyryl)phenoxy]acetic acid in the form of a white solid, M.P. 128–139° C. One recrystallization from a mixture of benzene and cyclohexane gives 28.7 g. (90%) of the product in the form of needles, melting at 144.5–145.5° C.

Step C: [2,3-dichloro-4-(2-bromo-2-ethylbutyryl)phenoxy]acetic acid.—This product is prepared by substantially the same method described in Example 14, Step C, using the following reagents:

[2,3-dichloro-4-(2-ethylbutyryl)phenoxy]acetic acid—19.26 g., 0.0603 mole.
Bromine—9.64 g., 0.0603 mole.
Glacial acetic acid—530 ml.

The above process gives 23.71 g. (99%) of [2,3-dichloro-4-(2-bromo-2-ethylbutyryl)phenoxy]acetic acid in the form of a white solid, M.P. 151.5–152.5° C.

One recrystallization from benzene gives the product in the form of white needles, M.P. 151.5–152.5° C.

Example 16.—[2-methyl-3-chloro-4-(2-bromo-2-ethylbutyryl)phenoxy]acetic acid

Step A: [2-methyl-3-chloro - 4 - (2 - ethylbutyryl)phenoxy]acetic acid.—2-ethyl-2'-methyl-3'-chloro-4'-hydroxybutyrophenone (36.0 g., 0.15 mole) in water (120 ml.) is combined with a solution of sodium hydroxide (24 g., 0.60 mole) in water (5 ml.). To the resulting solution at 45° C. is added with stirring a solution of chloroacetic acid (28.3 g., 0.30 mole) in water (10 ml.), over a period of 1 hour at a temperature of 40–45° C. The temperature is raised to 100° C. over a period of 30 minutes and stirring continued at 100° C. for 40 minutes. The reaction mixture at 100° C. is treated with a solution of chloroacetic acid (5.2 g., 0.055 mole) in water (10 ml.) over a period of 2 hours. Simultaneously and during the following 3 hours of stirring at 100° C., a solution of sodium hydroxide (4.4 g., 0.11 mole) in water (10 ml.) is added at intervals when needed to keep the reaction mixture basic. The boiling solution is acidified with concentrated hydrochloric acid. The oil that separates after chilling in an ice bath to room temperature is extracted with ether, dried over anhydrous sodium sulfate and the ether evaporated at reduced pressure to give an oil. The oil is dissolved in benzene and the benzene removed under reduced pressure to give a waxy solid. The crude product obtained is recrystallized from benzene (300 ml.) and cyclohexane (500 ml.) to give 20.0 g. (45% yield) of [2 - methyl - 3 - chloro - 4 - (2 - ethylbutyryl)phenoxy] acetic acid which melts at 143–144° C.

Step B: [2-methyl-3-chloro-4-(2-bromo-2-ethylbutyryl)-phenoxy]acetic acid.—To a solution of [2 - methyl-3-chloro-4-(2-ethylbutyryl)-phenoxy]acetic acid (14.8 g., 0.06 mole) in 350 ml. of acetic acid is added with stirring 48% hydrobromic acid (2 drops) followed by the dropwise addition of bromine (9.63 g., 0.06 mole) in 50 ml. of acetic acid. After the addition is completed, the mixture is stirred for 15 minutes and then poured into 1 liter of water containing 2 g. of sodium bisulfite. The solid that separates is collected on a filter, washed with water, dried in air and crystallized from 55 ml. of benzene. The crude product (19.2 g., 85%) thus obtained is recrystallized from benzene (100 ml.) and cyclohexane (350 ml.) to give 16 g. of [2-methyl-3-chloro-4-(2-bromo-2-ethylbutyryl)phenoxy]acetic acid which melts at 136–137° C.

Example 17.—[2,3-dimethyl-4-(2-bromo-2-ethylbutyryl)-phenoxy]acetic acid

Step A: [2,3-dimethyl - 4 - (2-ethylbutyryl)phenoxy]-acetic acid.—The above product is prepared by substantially the same procedure as described in Example 3, Step A, using the following substances:

(2,3-dimethylphenoxy)acetic acid (0.50 mole)___g__ 90
2-ethylbutyryl chloride (0.62 mole)_____g__ 84
Carbon disulfide_____ml__ 400
Aluminum chloride_____g__ 217

There is thus obtained 65 g. (47%) of [2,3-dimethyl-4-(2-ethylbutyryl)phenoxy]acetic acid which, after recrystallization from methylcyclohexane, melts at 97–98° C.

Step B: [2,3-dimethyl-4-(2-bromo - 2 - ethylbutyryl)-phenoxy]acetic acid.—The above product is prepared by substantially the same procedure as described in Example 14, Step C, using the following substances:

[2,3-dimethyl-4-(2-ethylbutyryl)phenoxy]acetic acid
(0.0374 mole) _____g__ 10.4
Bromine (0.0374 mole) _____g__ 60
Glacial acetic acid_____ml__ 250

The product, [2,3 - dimethyl-4-(2-bromo-2-ethylbutyryl)phenoxy]acetic acid, obtained by the above procedure (13.4 g., 100%), after recrystallization from 160 ml. of cyclohexane, melts at 117–118° C.

Example 18.—[3-chloro-4-(2-propyl-2-bromovaleryl)phenoxy]acetic acid

Step A: 3'-chloro-4'-hydroxy-2-propylvalerophenone.—To a mixture of 3-chloroanisole (31.52 g., 0.2 mole) and 2-propylvaleryl chloride (26.92 g., 0.2 mole) in petroleum ether, aluminum chloride (73.34 g., 0.6 mole) is added gradually with stirring at 5° C. over a period of 0.5 hour. The mixture is stirred at 5° C. for 20 minutes and then allowed to warm to 25° C. while stirring for an additional 3 hours. The mixture then is kept at 25–30° C. for 48 hours. Petroleum ether then is decanted and the residue added to 500 g. of ice containing 40 ml. of concentrated hydrochloric acid. The dark oil that separates is extracted with ether, the ether solution washed with water and extracted with 2.5% sodium hydroxide. The sodium hydroxide extract is treated with Norite, filtered free of carbon and acidified with hydrochloric acid to give a green oil which in turn is extracted with ether. The ether extract is dried over sodium sulfate, the ether evaporated and the residue distilled at 148–181° C. at 0.3 mm. pressure to give, upon redistillation, 12.96 g. of 3'-chloro-4'-hydroxy-2-propylvalerophenone in the form of a viscous oil, B.P. 140° C. at 0.5 mm. pressure.

Step B: [3 - chloro-4-(2-propylvaleryl)phenoxy]acetic acid.—3'-chloro - 4' - hydroxy - 2 - propylvalerophenone (13.21 g., 0.0518 mole) is added to a solution of sodium (1.19 g., 0.0518 mole) dissolved in absolute ethanol (100 ml.). The mixture is heated and stirred while ethyl bromoacetate (8.66 g., 0.0518 mole) is added over a period of 10 minutes. After heating for 6 hours on the steam bath, the ethanol is removed at reduced pressure and the residue hydrolyzed in aqueous sodium hydroxide. The solution is shaken with Norite, filtered free of solid and acidified with hydrochloric acid. The solid that separates is dried in air to give 7.7 g. of [3-chloro-4-(2-propylvaleryl)phenoxy]-acetic acid which, after crystallization from benzene, melts at 134–135° C.

Step C: [3-chloro-4-(2 - propyl-2-bromovaleryl)phenoxy]acetic acid.—The compound obtained in Step B (7.2 g., 0.023 mole) is dissolved in acetic acid (100 ml.) and brominated by substantially the same procedure described in Example 14, Step C, to give 8.05 g. of [3-chloro-4-(2 - propyl-2-bromovaleryl)phenoxy]acetic acid which after crystallization from a 9:25 mixture of cyclohexane and benzene melts at 125–125.5° C.

Example 19.—[3-chloro-4-(2,3-dimethyl-2-bromo-butyryl)phenoxy]acetic acid

Step A: (3-chloro-4-isovalerylphenoxy)acetic acid.—By substituting the following reagents for those employed in Example 11, Step A, and following substantially the procedure described therein (3-chloro-4-isovalerylphenoxy)-acetic acid is obtained:

| | |
|---|---|
| Isovaleryl chloride (0.272 mole)_____g__ | 32.6 |
| (3-chlorophenoxy)acetic acid (0.24 mole)____g__ | 44.7 |
| Aluminum chloride (0.755 mole)_____g__ | 101 |
| Carbon disulfide_____ml__ | 250 |

The crude product is obtained in the form of a gummy solid which is triturated with one liter of hot 5% sodium bicarbonate and the resulting solution is filtered from insoluble aluminum salts. The filtrate is treated with Darco (decolorizing charcoal) (5 g.) and acidified with hydrochloric acid. The solid that separates is dried and crystallized from benzene to give 33.8 g. of (3-chloro-4-isovalerylphenoxy)acetic acid, M.P. 107–108° C.

Step B: [3-chloro - 4 - (2-dimethylaminomethylisovaleryl)phenoxy]acetic acid hydrochloride.—In a 100 ml. round flask equipped with an outlet tube suitable for application of intermittent suction, an intimate mixture of (3-chloro-4-isovalerylphenoxy)acetic acid (27 g., 0.1 mole), paraformaldehyde (3 g., 0.1 mole), dry dimethylamine hydrochloride (8.15 g., 0.1 mole) and acetic acid (0.5 ml.) is heated on the steam bath for about 1.5 hours during which period suction is applied for about 1-minute intervals 5 or 6 times. The warm reaction mixture is dissolved in 50 ml. of hot acetone. The solid (22 g.) that separates on cooling melts at 159–163° C. After digesting this product in hot acetone, the purified [3-chloro-4-(2 - dimethylaminomethyl)isovalerylphenoxy]acetic acid hydrochloride is obtained, M.P. 167–169° C.

Step C: [3 - chloro - 4 - (2 - methyleneisovaleryl)phenoxy]acetic acid.—The Mannich compound obtained as described above (19 g., 0.052 mole) is dissolved in 25 ml. of water and the solution made slightly basic by the addition of 10% sodium bicarbonate solution. The resulting solution is heated for 25 minutes on a steam bath, cooled and acidified with 6 N hydrochloric acid to give [3 - chloro-4-(2-methyleneisovaleryl)phenoxy]acetic acid which, after crystallization from benzene, melts at 122.5–123.5° C.; yield 9 g.

Step D: [3 - chloro - 4 - (2,3 - dimethylbutyryl)phenoxy]acetic acid.—[3-chloro - 4 - (2 - methyleneisovaleryl)phenoxy]acetic acid (10 g., 0.0355 mole) is dissolved in isopropanol (275 ml.) and hydrogenated in the presence of 5% palladium on charcoal at 26° C. and 756 mm. pressure on a Parr apparatus. In about 40 minutes hydrogen is absorbed. The solution is warmed and filtered to remove the catalyst, the alcohol is evaporated and the residue crystallized from benzene to give 8.4 g. of [3-chloro-4-(2-dimethylbutyryl)phenoxy]acetic acid which melts at 132.5–133.5° C.

Step E: [3 - chloro - 4 - (2,3 - dimethyl-2-bromobutyryl)phenoxy]acetic acid.—[3 - chloro - 4 - (2,3-dimethylbutyryl)phenoxy]acetic acid (2.96 g.), prepared by the method described in Step D, is brominated by following substantially the same procedure described in Example 14, Step C, to give 2.8 g. of [3-chloro-4-(2,3-dimethyl-2-bromobutyryl)phenoxy]acetic acid which, after crystallization from benzene, melts at 151.5–152° C.

Example 20.—[3 - chloro - 4 - (2 - bromo-2-isopropyl-butyryl)phenoxy]acetic acid Step A: 2' - chloro - 4' - hydroxy-2-isopropylbutyrophenone.—To a mixture of 3-chloroanisole (38.8 g., 0.272 mole) and 2-isopropylbutyryl chloride (25 g., 0.168 mole) in carbon disulfide (250 ml.), there is added, with stirring, aluminum chloride (46.6 g., 0.35 mole). The mixture then is heated at 50–60° C. for 5 hours. The carbon disulfide then is removed by distillation, heptane (300 ml.) and aluminum chloride (26.67 g., 0.2 mole) is added and the mixture stirred and heated on the steam bath for 2 hours. The solvent then is decanted and ice water (400 ml.) is added slowly with external cooling in an ice bath. This is followed by addition of concentrated hydrochloric acid (40 ml.) and extraction with ether. The ether extract is washed with water, dried over sodium sulfate and the ether then evaporated and the residue distilled. The fraction boiling at 156–167° C. at 0.5 mm. pressure (15.8 g.) is collected. The product solidifies and after crystallization from cyclohexane gives 7.14 g. of 2'-chloro-4'-hydroxy-2-isopropylbutyrophenone, M.P. 75–77° C.

Step B: [3 - chloro - 4 - (2-isopropylbutyryl)phenoxy] acetic acid.—By replacing the phenone used in Example 14, Step B, by an equimolecular quantity of 2'-chloro-4'-hydroxy-2-isopropylbutyrophenone and following substantially the same procedure described therein, there is obtained [3 - chloro - 4 - (2 - isopropylbutyryl)phenoxy] acetic acid which, after crystallization from a mixture of benzene and hexane, melts at 136–137° C.

Step C: [3 - chloro - 4 - (2 - bromo-2-isopropylbutyryl)phenoxy]acetic acid.—The product obtained in Step B (6.61 g., 0.0221 mole) is brominated by substantially the same procedure described in Example 14, Step C, to give 4 g. of [3-chloro-4-(2-bromo-2-isopropylbutyryl)phenoxy]acetic acid which, after crystallization from a mixture of benzene and hexane, melts at 126–127° C.

Example 21.—[3-methyl-4-(2-bromo-2-isopropyl-3-methylbutyryl)phenoxy]acetic acid Step A: 2 - isopropyl - 3,2' - dimethyl-4'-hydroxybutyrophenone.—To a stirred mixture of 3-methoxytoluene (24.43 g., 0.2 mole), 2-isopropyl-3-methylbutyryl chloride (32.53 g., 0.2 mole) and carbon disulfide (200 ml.), in a 1 liter flask equipped with a reflux condenser and stirrer, aluminum chloride (26.6 g., 0.2 mole) is added slowly with stirring at 10–20° C. by means of an Erlenmeyer flask attached by a Gooch sleeve to a neck of the reaction flask. The mixture then is boiled gently for 6½ hours and the carbon disulfide then removed by distillation. n-Heptane (100 ml.) and aluminum chloride (26.67 g.) are then added and the mixture refluxed for 7 hours, cooled and ice water (400 ml.) added cautiously with stirring and cooling in an ice bath. The mixture then is acidified with concentrated hydrochloric acid (40 ml.) and the organic components extracted with ether. The ether solution is washed with water and extracted with excess 10% sodium hydroxide in several portions. The basic extracts are combined and washed with ether and acidified with hydrochloric acid. The tan solid that separates (M.P. 114–119° C., 12.85 g.) is crystallized from benzene to give 9.67 g. of 2-isopropyl-3,2'-dimethyl-4'-hydroxybutyrophenone, M.P. 123–124.5° C.

Step B: [3 - methyl - 4 - (2-isopropyl-3-methylbutyryl)phenoxy]acetic acid.—Sodium (0.816 g., 0.0355 g. atom) is dissolved in anhydrous ethanol (100 ml.) in a suitable apparatus and the product prepared in Step A (8.30 g., 0.0355 mole) added to the solution. The mixture is heated to boiling and ethyl bromoacetate (5.93 g., 0.0355 mole) added and the mixture heated for 4 hours. The alcohol then is evaporated and the residue heated at 80–90° C. with 10% sodium hydroxide (50 ml.) for 4 hours. The mixture is cooled, extracted with ether and acidified with hydrochloric acid and the solid that separates extracted with ether. The ether extract is separated, washed with water and dried over sodium sulfate, the ether evaporated and the residue crystallized from a mixture of benzene and cyclohexane to give 1.9 g. of [3-methyl-4-(2-isopropyl - 3 - methylbutyryl)phenoxy]acetic acid, M.P. 95–95.5° C.

Step C: [3-methyl-4-(2 - bromo-2-isopropyl-3-methylbutyryl)phenoxy]acetic acid.—The product prepared in Step B (5 g., 0.017 mole) is dissolved in acetic acid (40 ml.), the solution heated to 50° C. and a few drops of a solution of bromine (2.56 g., 0.016 mole) in acetic acid (20 ml.) is added. The bromine color persists for 30 minutes at which time 48% hydrobromic acid (½ ml.) is added and the red bromine color slowly disappears. The mixture is allowed to cool to 20–25° C. and about ½ of the remaining bromine solution is added during 30 minutes. After an additional 2 hours at 20–30° C., the reaction mixture, which again is pale yellow, is heated to 50° C. and the remainder of the bromine solution added over 30 minutes. The mixture is kept at 20–25° C. for 17 hours and then poured into water containing a little sodium bisulfite. The solid that separates is collected by filtration, washed well with water to give 6.3 g. of [3-methyl-4-(2-bromo-2-isopropyl-3-methylbutyryl)phenoxy]acetic acid, M.P. about 140–141° C.

Example 22.—[3-chloro-4-(2-bromo-2-methylvaleryl) phenoxy]acetic acid

Step A: (3-chloro-4-n-valerylphenoxy)acetic acid.—A dry, one-liter round flask is equipped with a stirrer and reflux condenser. Into the flask is placed n-valeryl chloride (36.2 g., 0.30 mole), (3-chlorophenoxy)acetic acid (44.7 g., 0.24 mole) and carbon disulfide (240 ml.). Powdered aluminum chloride (101 g., 0.755 mole) is added in small portions at 10° C. with mechanical stirring. After half of the aluminum chloride is added, the mixture becomes quite viscous and the remainder of the aluminum chloride is added with hand stirring. When the mixture becomes mobile enough, mechanical stirring is resumed and continued for one hour. The mixture then is heated at 50° C. with stirring for an additional three hours. The carbon disulfide is decanted and the residue is added to a mixture of 1 kg. of ice and 30 ml. of concentrated hydrochloric acid. The oil that separates is extracted with ether and the ether extract then is extracted with 10% sodium bicarbonate solution. The bicarbonate extract is acidified with concentrated hydrochloric acid and the crude product obtained is crystallized from a 2:1 mixture of ligroin and benzene to give 30 g. of (3-chloro-4-n-valerylphenoxy)acetic acid, M.P. 82.5–83.5° C.

Step B: [4 - [2 - (dimethylaminomethyl)valeryl] - 3-chlorophenoxy]acetic acid hydrochloride.—In a 100 ml. round flask equipped with an outlet tube suitable for application of intermittent suction, an intimate mixture of (3-chloro-4-n-valerylphenoxy)acetic acid (6.76 g., 0.025 mole), paraformaldehyde (0.825 g., 0.0275 mole), dry dimethylamine hydrochloride (2.24 g., 0.0275 mole) and acetic acid (4 drops) is heated on the steam bath for about 1.5 hours, during which period suction is applied for about 1-minute intervals five or six times. The syrupy residue obtained is triturated with ether to give 5.4 g. of [3-chloro - 4 - [2 - (dimethylaminomethyl)valeryl]phenoxy]acetic acid hydrochloride in the form of a solid which is collected and used in the following step without further purification.

Step C: [3-chloro - 4 - (2-methylenevaleryl)phenoxy] acetic acid.—The [3-chloro-4-[2 - (dimethylaminomethyl)valeryl]phenoxy]acetic acid hydrochloride prepared as described above is dissolved in water and filtered to remove cloudiness. The clear solution then is made basic with sodium bicarbonate and heated for 25 minutes on a steam bath. The resulting solution is then cooled and acidified with 6 N hydrochloric acid to give 1.8 g. of [3-chloro-4-(2-methylenevaleryl)phenoxy]acetic acid in the form of a solid which, after crystallization from benzene, gives 1.4 g. of purified [3-chloro-4-(2-methylenevaleryl) phenoxy]acetic acid, M.P. 101–102° C.

Step D: [3-chloro-4-(2-methylvaleryl)phenoxy]acetic acid.—[3-chloro-4-(2 - methylenevaleryl)phenoxy]acetic acid (8.7 g.), prepared as described in Step C, is dissolved in isopropyl alcohol (250 ml.) and 5% palladium on charcoal (3 g.) is added. The mixture is hydrogenated at an initial pressure of 35 p.s.i. on a Parr apparatus. In about 40 minutes the required amount of hydrogen is absorbed. The solution is warmed and filtered to remove the catalyst, the alcohol is evaporated and the residue crystallized from benzene to give 4.8 g. of [3-chloro-4-(2-methylvaleryl)phenoxy]acetic acid which, after crystallization from benzene, melts at 123–124.5° C.

Step E: [3-chloro-4-(2 - bromo-2-methylvaleryl)phenoxy]acetic acid.—The [3-chloro - 4 - (2-methylvaleryl) phenoxy]acetic acid obtained in Step D (2.15 g., 0.0075 mole) is brominated by following substantially the same procedure described in Example 17, Step B, to give 2.1 g. of [3 - chloro-4-(2-bromo-2-methylvaleryl)phenoxy] acetic acid which, after crystallization from a 2:1 mixture of cyclohexane and benzene, melts at 115–117° C.

Example 23.—[3-chloro-4-(2-bromo-2-isobutylpropionyl)phenoxy]acetic acid

Step A: [3-chloro-4-(4-methylvaleryl)phenoxy]acetic acid.—This product is prepared following substantially the same procedure described in Example 22, Step A, using the following reactants:

| | | |
|---|---|---|
| 4-methylvaleryl chloride (0.272 mole) | g. | 134.6 |
| (3-chlorophenoxy)acetic acid (0.24 mole) | g. | 44.8 |
| Aluminum chloride (0.755 mole) | g. | 108 |
| Carbon disulfide | ml. | 250 |

The product, [3-chloro-4-(4 - methylvaleryl)phenoxy] acetic acid, is obtained in the form of a colorless solid and, after crystallization from a mixture of ether and ligroin, there is obtained [3-chloro-4-(4-methylvaleryl) phenoxy]acetic acid, M.P. 89.5–90° C., yield 20 g.

Step B: [3-chloro - 4 - (2-methylene-4-methylvaleryl) phenoxy]acetic acid.—A mixture of [3-chloro-4-(4-methylvaleryl)phenoxy]acetic acid (17.5 g., 0.063 mole), paraformaldehyde (1.91 g., 0.063 mole), dimethylamine hydrochloride (5.15 g., 0.063 mole) and acetic acid (0.5 ml.) is heated at 90–100° C. for 4 hours. The mixture then is dissolved in acetone (40 ml.) and ether added until no further precipitate is formed. The ether-acetone mixture (a) is decanted and the residue dissolved in water. The aqueous solution (b) is extracted with ether, made basic with 10% sodium bicarbonate, heated at 80–90° C. for 15 minutes and acidified with hydrochloric acid. The solid that separates is collected by filtration, M.P. 114–116° C. The ether-acetone extract (a) is extracted with 5% sodium bicarbonate solution in portions until acidification of the aqueous extract yields no further precipitate. The bicarbonate extracts are combined and acidified with hydrochloric acid to give a solid, M.P. 111–114° C. The two crops of solids are combined, dried in air at 65° C. and then crystallized from a 9:10 mixture of cyclohexane and benzene and then from benzene to give 14.1 g. of [3-chloro-4-(2-methylene-4-methylvaleryl)phenoxy]acetic acid, M.P. 115–116° C.

Step C: [3-chloro-4-(2 - isobutylpropionyl)phenoxy] acetic acid.—[3-chloro-4-(2-methylene-4-methylvaleryl) phenoxy]acetic acid (19.05 g., 0.0642 mole), prepared as described in Step B, is hydrogenated by substantially the same procedure described in Example 22, Step E, to give 13.1 g. of [3-chloro-4-(2-isobutylpropionyl)phenoxy] acetic acid which, after crystallization from benzene, melts at 127–128.5° C.

Step D: [3-chloro-4-(2-bromo - 2 - isobutylpropionyl) phenoxy]acetic acid.—To a solution of [3-chloro-4-(2-isobutylpropionyl)phenoxy]acetic acid (12.1 g., 0.0405 mole) in 200 ml. of acetic acid is added, with stirring, 48% hydrobromic acid (2 drops) followed by the dropwise addition of bromine (6.0 g., 0.0374 mole) in 50 ml. of acetic acid. After the addition is completed, the mixture is stirred for 15 minutes and then poured into one liter of water containing 2 g. of sodium bisulfite. The solid that separates is collected on a filter, washed with water, dried in air and crystallized from 55 ml. of benzene to give 14.4 g. of [3-chloro-4-(2-bromo - 2 - isobutylpropionyl) phenoxy]acetic acid, M.P. 115–116° C.

Example 24.—[3-chloro-4-[2-bromo-2-(bromomethyl) butyryl]phenoxy]acetic acid

Step A: [3 - chloro-4-[2 - (dimethylaminomethylbutyryl]-phenoxy]acetic acid.—In a 100 ml. round flask equipped with an outlet tube suitable for application of intermittent suction, an intimate mixture of (3-chloro-4-butyrylphenoxy)acetic acid (14.52 g., 0.06 mole), prepared by the method described in Example 11, Step A, paraformaldehyde (2.1 g., 0.072 mole), dry dimethylamine hydrochloride (5.34 g., 0.066 mole) and acetic acid (4 drops) is heated on the steam bath for about 1.5 hours during which period suction is applied for about one-minute intervals five or six times. Upon cooling, a solid (19 g.) is obtained, which is triturated with acetone. The white solid that forms is crystallized from acetonitrile and isopropyl alcohol to give [4-[2-(dimethylaminomethyl)-butyryl]-3-chlorophenoxy]acetic acid hydrochloride, M.P. 127–129° C.

Step B: [3-chloro-4-(2-methylenebutyryl)phenoxy] acetic acid.—The Mannich compound obtained as described in Step A (1 g., 0.003 mole) is dissolved in 25 ml. of water and the solution made slightly basic by the addition of 10% sodium bicarbonate solution. The resulting solution is heated for 25 minutes on a steam bath, cooled and acidified with 6 N hydrochloric acid to give 0.7 g. of solid [3-chloro-4-(2-methylenebutyryl)phenoxy] acetic acid. After recrystallization from a mixture of cyclohexane and benzene there is obtained [3-chloro-4-(2-methylenebutyryl)phenoxy]acetic acid in the form of colorless crystals, M.P. 109–110° C.

Step C: [3-chloro-4-[2-bromo-2-(bromomethyl)butyryl]phenoxy]-acetic acid.—[3-chloro-4-(2-methylenebutyryl)phenoxy]acetic acid (4.03 g., 0.015 mole) is dissolved in 150 ml. of boiling carbon tetrachloride and a solution of bromine (2.4 g., 0.015 mole) in 50 ml. of carbon tetrachloride is added over a period of 5 minutes. The bromine color rapidly disappears after addition to the boiling solution. The solution is cooled and the white solid that separates is removed by filtration and washed with fresh carbon tetrachloride to give 5.94 g. (92%) of [3-chloro-4-[2-bromo-2-(bromomethyl)butyryl]phenoxy]acetic acid, M.P. 146–149° C. The product is recrystallized alternately from toluene and then acetonitrile to give [3-chloro-4-[2-bromo-2-(bromomethyl)butyryl]phenoxy]acetic acid acid melting at 153.5–155° C. (corr.).

Example 25.—[3-chloro-4-(2-bromobutyryl)phenoxy] acetic acid

Step A: (3-chloro-4-butyrylphenoxy)acetic acid.—Powdered aluminum chloride (217 g., 1.625 mole) and carbon disulfide (400 ml.) are placed in a 1-liter, 4-necked flask equipped with a stirrer, dropping funnel, reflux condenser and internal thermometer. (3-chlorophenoxy)acetic acid (44.7 g., 0.24 mole) is added in portions with stirring and then n-butyryl chloride (66.6 g., 0.625 mole) is added dropwise with stirring over a period of 0.5 hour at a temperature of about 22–26° C. After stirring one hour at room temperature, the reaction flask is placed in a water bath and the temperature maintained at 50° C. for three hours. The carbon disulfide then is decanted and a gummy reaction product is obtained which is added to a mixture of ice (1 kg.) and concentrated hydrochloric acid (100 ml.) A solid separates and is dissolved in saturated sodium bicarbonate solution (1.5 l.) The solution is filtered, and the clear yellow filtrate obtained is acidified with hydrochloric acid. The yellow oil that separates solidifies slowly to give a solid melting at 76–85° C. After recrystallization from benzene there is obtained 66.7 g. (51%) of (3-chloro-4-butyrylphenoxy)acetic acid, M.P. 89–90° C.

Step B.—[3-chloro-4-(2-bromobutyryl)phenoxy]acetic acid.—(3-chloro-4-butyrylphenoxy)acetic acid (12.8 g., 0.05 mole), prepared as described in Step A, is brominated by substantially the same method described in Example 14, Step C, to give [3-chloro-4-(2-bromobutyryl)phenoxy]acetic acid, M.P. 154–155° C. which, when recrystallized from a 30:1 mixture of benzene and isopropanol, yields 7.8 g. of product. The solvent is removed from the product by drying for about 16 hours at 1 mm. pressure with suction.

Example 26.—[3-chloro-4-(2-bromopropionyl)-phenoxy]acetic acid

Step A: (3-chloro-4-propionylphenoxy)acetic acid.—Powdered aluminum chloride (216 g., 1.625 mole) and carbon disulfide (400 ml.) are placed in a one-liter, 4-necked flask equipped with a stirrer, dropping funnel, reflux condenser and internal thermometer. (3-chlorophenoxy)acetic acid (93.29 g., 0.5 mole) is added in portions with stirring and then propionyl chloride (57.8 g., 0.625 mole) is added dropwise with stirring over a period of 0.5 hour at a temperature of about 22–26° C. After stirring one hour at room temperature the reaction flask is placed in a water bath and the temperature maintained at 50° C. for three hours. The carbon disulfide then is decanted and the aluminum complex remaining is added to a mixture of 500 g. of ice and 125 ml. of concentrated hydrochloric acid. There is thus obtained 77 g. of (3-chloro-4-propionylphenoxy)acetic acid, M.P. 108–109.5° C.

Step B: [3-chloro-4-(2-bromopropionyl)phenoxy]acetic acid.—(3-chloro-4-propionylphenoxy)acetic acid (10.7 g., 0.04 mole) is added to 90 ml. of glacial acetic acid at room temperature. Bromine (25.7 g., 0.16 mole) in 30 ml. of glacial acetic acid is added dropwise to the reaction mixture at 25° C. with stirring during a period of one hour. Stirring is continued an additional hour and then the mixture is added to a mixture of 300 g. of ice and 500 ml. of water. The solid which separates is collected on a filter, washed and recrystallized from benzene to give 12 g. of [3-chloro-4-(2-bromopropionyl)-phenoxy]acetic acid, M.P. 151–153° C. After recrystallization from a 5:2 mixture of hexane and isopropyl alcohol, the product melts at 152–154° C.

What is claimed is:

1. A compound of the formula:

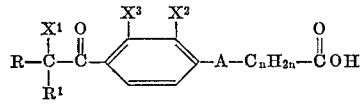

wherein A is a member selected from the group consisting of oxygen and sulfur, R is a member selected from the group consisting of hydrogen, lower alkyl, trifluoromethyl substituted lower alkyl and cycloalkyl, $R^1$ is a member selected from the group consisting of hydrogen and lower alkyl and, taken together, R and $R^1$ may be joined to form a cycloalkyl ring containing five nuclear carbon atoms, $X^1$ represents halogen, $X^2$ and $X^3$ represent similar or dissimilar radicals selected from the group consisting of hydrogen, halogen, lower alkyl, lower alkoxy and, taken together, the $X^2$ and $X^3$ radicals may be combined to form a 1,3-butadienylene linkage, at least one of which $X^2$ and $X^3$ radicals is other than hydrogen, and $n$ is an integer having a value of 1–5.

2. A compound of the formula:

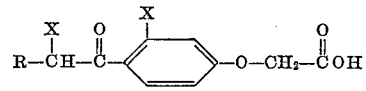

wherein R represents lower alkyl and both of the X radicals represent halogen.

3. A compound of the formula:

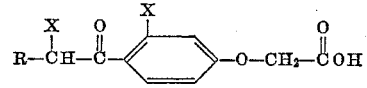

wherein R represents cycloalkyl containing 4–6 nuclear carbon atoms and both of the X radicals represent halogen.

4. A compound of the formula:

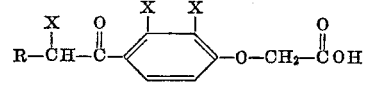

wherein R represents cycloalkyl containing 4-6 nuclear carbon atoms and each of the X radicals represents halogen.

5. A compound of the formula:

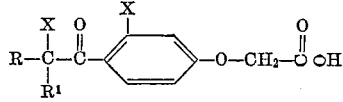

wherein the radicals R and $R^1$ represent lower alkyl and both of the X radicals represent halogen.

6. [3-chloro-4-(2-bromoisovaleryl)phenoxy]acetic acid.
7. [3-chloro-4-(2-chloroisovaleryl)phenoxy]acetic acid.
8. [3-chloro-4-(2-ethyl-2-bromobutyryl)phenoxy]acetic acid.
9. [3-chloro-4-(2-bromo-2-cyclohexaneacetyl)phenoxy] acetic acid.
10. [3 - chloro-4-(2-bromo-2-cyclopentaneacetyl)phenoxy]acetic acid.
11. [2,3 - dichloro - 4 - (2-bromo-2-cyclohexaneacetyl) phenoxy]acetic acid.
12. [3 - chloro - 4-(2,3-dimethyl-2-bromobutyryl)phenoxy]acetic acid.
13. [3 - chloro-4-(2-bromo-2-methylvaleryl)phenoxy] acetic acid.

References Cited
UNITED STATES PATENTS
2,761,873  9/1956  Gregory et al. _____ 260—516
3,010,995  11/1961  Litvan et al. _____ 260—521

OTHER REFERENCES
Joseph B. Nierderl and Seymour J. Lederer, J. Organ. Chem., 17, 1617–20 (1952).

John D. Roberts and Marjorie C. Caserio, "Basic Principles of Organic Chemistry," W. A. Benjamin, Inc., New York, 1965, p. 473.

LORRAINE A. WEINBERGER, *Primary Examiner.*

D. E. STENZEL, *Assistant Examiner.*